United States Patent
Helms et al.

(10) Patent No.: US 10,844,675 B2
(45) Date of Patent: Nov. 24, 2020

(54) AUTONOMOUS CONNECTION MAKEUP AND EVALUATION

(71) Applicant: Weatherford Technology Holdings, LLC, Houston, TX (US)

(72) Inventors: Martin Helms, Burgdorf (DE);
Karsten Heidecke, Houston, TX (US);
Rainer Ruehmann, Hannover (DE);
Bjoern Thiemann, Burgwedel (DE);
Michael Wiedecke, Salzhemmendorf (DE)

(73) Assignee: Weatherford Technology Holdings, LLC, Houston, TX (US)

(*) Notice: Subject to any disclaimer, the term of this patent is extended or adjusted under 35 U.S.C. 154(b) by 35 days.

(21) Appl. No.: 16/229,859

(22) Filed: Dec. 21, 2018

(65) Prior Publication Data
US 2020/0199952 A1    Jun. 25, 2020

(51) Int. Cl.
| | | |
|---|---|---|
| *E21B 19/16* | (2006.01) | |
| *E21B 17/042* | (2006.01) | |
| *E21B 19/10* | (2006.01) | |
| *E21B 45/00* | (2006.01) | |
| *F16H 59/14* | (2006.01) | |

(52) U.S. Cl.
CPC .......... *E21B 19/166* (2013.01); *E21B 17/042* (2013.01); *E21B 19/10* (2013.01); *E21B 45/00* (2013.01); *F16H 59/141* (2013.01)

(58) Field of Classification Search
CPC ............................. E21B 19/166; E21B 19/165
See application file for complete search history.

(56) References Cited

U.S. PATENT DOCUMENTS

| 3,368,396 | A | 2/1968 | VanBurkleo et al. |
| 3,594,587 | A | 7/1971 | Martens et al. |
| 3,745,820 | A | 7/1973 | Weiner |
| 3,855,857 | A | 12/1974 | Claycomb |
| 4,008,773 | A | 2/1977 | Wallace et al. |

(Continued)

FOREIGN PATENT DOCUMENTS

| AU | 2014215938 A1 | 9/2014 |
| CA | 2586317 A1 | 10/2007 |

(Continued)

OTHER PUBLICATIONS

Rühmann, et al.; OTC 21874; Shoulder Yielding Detection During Pipe Makeup; dated May 2-5, 2011; 11 total pages.

(Continued)

*Primary Examiner* — Kipp C Wallace
(74) *Attorney, Agent, or Firm* — Patterson + Sheridan, LLP (57) ABSTRACT

Embodiments of the present disclosure relate to apparatus and methods for making up and evaluating tubular threaded connections. A tong assembly may be used for making up threaded connections. A threaded connection may be made up automatically by controlling the rotation speed of the tong assembly according to measurements of torque, turns, and/or time. After a threaded connection is made up, measurements of time, torque, and/or turns may be corrected based on operating parameters. The corrected measurements may be evaluated for indications of failure, such as discontinuity, torque spikes, and torque drops. The threaded connection is then accepted or rejected based on the evaluation.

17 Claims, 5 Drawing Sheets

(56) References Cited

U.S. PATENT DOCUMENTS

| | | | |
|---|---|---|---|
| 4,091,451 A * | 5/1978 | Weiner | B23P 19/06 |
| | | | 700/275 |
| 4,106,176 A | 8/1978 | Rice et al. | |
| 4,176,436 A | 12/1979 | McCombs et al. | |
| 4,365,402 A | 12/1982 | McCombs et al. | |
| 4,402,052 A * | 8/1983 | Stone | E21B 19/166 |
| | | | 29/240 |
| 4,404,559 A | 9/1983 | Renner | |
| 4,592,125 A | 6/1986 | Skene | |
| 4,709,182 A | 11/1987 | Wenske et al. | |
| 4,715,451 A | 12/1987 | Bseisu et al. | |
| 4,738,145 A | 4/1988 | Vincent et al. | |
| 4,867,236 A | 9/1989 | Haney et al. | |
| 4,875,530 A | 10/1989 | Frink et al. | |
| RE33,526 E | 1/1991 | Coyle, Sr. | |
| 5,130,700 A | 7/1992 | Annis et al. | |
| RE34,063 E | 9/1992 | Vincent et al. | |
| 5,205,163 A | 4/1993 | Sananikone | |
| 5,245,265 A | 9/1993 | Clay | |
| 5,245,877 A | 9/1993 | Ruark | |
| 5,272,925 A | 12/1993 | Henneuse et al. | |
| 5,315,501 A | 5/1994 | Whitehouse | |
| 5,402,688 A | 4/1995 | Okada et al. | |
| 5,637,968 A | 6/1997 | Kainec et al. | |
| 5,689,871 A | 11/1997 | Carstensen | |
| 6,082,224 A | 7/2000 | McDaniels et al. | |
| 6,212,763 B1 | 4/2001 | Newman | |
| 6,241,032 B1 | 6/2001 | Falgout, Sr. | |
| 6,374,706 B1 | 4/2002 | Newman | |
| 6,516,896 B1 | 2/2003 | Bookshar et al. | |
| 6,536,520 B1 | 3/2003 | Snider et al. | |
| 6,662,110 B1 | 12/2003 | Bargach et al. | |
| 6,814,149 B2 | 11/2004 | Liess et al. | |
| 7,028,585 B2 | 4/2006 | Pietras et al. | |
| 7,044,238 B2 | 5/2006 | Hutchinson | |
| 7,073,598 B2 | 7/2006 | Haugen | |
| 7,100,698 B2 | 9/2006 | Kracik et al. | |
| 7,210,710 B2 | 5/2007 | Williamson et al. | |
| 7,286,623 B2 | 10/2007 | Whetsel | |
| 7,294,608 B2 | 11/2007 | Oldiges et al. | |
| 7,296,623 B2 | 11/2007 | Koithan et al. | |
| 7,306,054 B2 | 12/2007 | Hutchinson | |
| 7,318,488 B2 | 1/2008 | Hutchinson | |
| 7,435,088 B2 | 10/2008 | Brajnovic | |
| 7,568,522 B2 | 8/2009 | Boutwell et al. | |
| 7,588,099 B2 | 9/2009 | Kracik | |
| 7,594,540 B2 | 9/2009 | Koithan et al. | |
| 7,707,913 B2 | 5/2010 | Halse | |
| 7,757,759 B2 | 7/2010 | Jahn et al. | |
| 7,882,902 B2 | 2/2011 | Boutwell, Jr. | |
| 8,042,432 B2 | 10/2011 | Hunter et al. | |
| 8,726,743 B2 | 5/2014 | Ruehmann et al. | |
| 2003/0164276 A1 | 9/2003 | Snider et al. | |
| 2003/0178847 A1 | 9/2003 | Galle et al. | |
| 2004/0144547 A1 | 7/2004 | Koithan et al. | |
| 2004/0154832 A1 | 8/2004 | Koithan | |
| 2007/0107912 A1 * | 5/2007 | Boutwell | E21B 19/166 |
| | | | 166/380 |
| 2009/0126536 A1 * | 5/2009 | Begnaud | E21B 19/165 |
| | | | 81/57.34 |
| 2009/0151934 A1 * | 6/2009 | Heidecke | E21B 19/165 |
| | | | 166/250.01 |
| 2009/0266539 A1 * | 10/2009 | Ruark | E21B 19/166 |
| | | | 166/250.01 |
| 2009/0274545 A1 | 11/2009 | Liess et al. | |
| 2010/0132180 A1 | 6/2010 | Conquergood et al. | |
| 2012/0273230 A1 | 11/2012 | Patterson et al. | |
| 2012/0330552 A1 | 12/2012 | Conquergood et al. | |
| 2015/0021016 A1 * | 1/2015 | Deng | E21B 19/166 |
| | | | 166/250.01 |
| 2017/0211344 A1 | 7/2017 | Aalderink et al. | |
| 2018/0216423 A1 * | 8/2018 | Henriksen | E21B 19/168 |
| 2020/0047336 A1 * | 2/2020 | Savini | E21B 19/165 |

FOREIGN PATENT DOCUMENTS

| | | |
|---|---|---|
| DE | 10 2014 210 860 A1 | 12/2015 |
| EP | 0018115 A1 | 10/1980 |
| EP | 3358124 A1 | 8/2018 |
| GB | 2 115 940 A | 9/1983 |
| GB | 2 443 955 A | 5/2008 |
| GB | 2474375 A | 4/2011 |
| WO | 2005/045177 A1 | 5/2005 |
| WO | 2012177324 A2 | 12/2012 |
| WO | 2013/142950 A1 | 10/2013 |
| WO | 2014071056 A2 | 5/2014 |

OTHER PUBLICATIONS

Tenaris Hydril; Make-up Acceptance Criteria; dated Apr. 3, 2013; 10 total pages.

Xie; Analysis of Strain Rate Impact on Makeup of Oilfield Premium Casing Connections; dated Apr. 3, 2013; 12 total pages.

PCT Notification of Transmittal of the International Search Report and the Written Opinion of the International Searching Authority for International Application No. PCT/US2012/036173; dated Apr. 12, 2013; 15 total pages.

PCT Notification of Transmittal of the International Search Report and the Written Opinion of the International Searching Authority for International Application No. PCT/US2018/016480; dated May 7, 2018; 13 total pages.

Extended European Search Report for Application No. 18154549.2; dated Jun. 4, 2018; 9 total pages.

EPO Extended European Search Report dated Apr. 24, 2020, for European Application No. 19217379.7.

PCT International Search Report and Written Opinion dated Jun. 26, 2020, for International Application No. PCT/US2019/068114.

\* cited by examiner

AUTONOMOUS CONNECTION MAKEUP AND EVALUATION

BACKGROUND OF THE DISCLOSURE

Field of the Disclosure

The present disclosure generally relates to a method for autonomously making up and evaluating threaded connections.

Description of the Related Art

Construction of oil or gas wells usually requires making long tubular strings that make up casing, risers, drill pipe or other tubing. Due to the length of these strings, sections or stands of tubulars are progressively added to or removed from the tubular strings as they are lowered or raised from a drilling platform.

The tubular strings are formed by connecting a plurality of tubulars by fluid-tight threaded joints. Each fluid-tight threaded joint is formed by making up two tubulars with a threaded connection at a target torque.

A tong assembly is commonly used to make up or break out joints in the tubular strings. Typically, a tong assembly may be manually controlled by an operator during makeup. A dump valve is usually used to stop the rotation when at a target torque. Depending on parameters of the tubulars, this manual control may lead to over torque, for example, when the rotational speed of the tong assembly is too high at a final stage of joint make up. Another approach to achieve the target torque is using a closed-loop control of torque or rotational speed during makeup. However, depending on the set speed, the closed-loop control method takes a long time to makeup each joint. Another approach to achieve the target torque is to rotate the tong assembly for a predetermined time at a constant speed. The predetermined time is obtained from heuristically measured values, which are results of particular parameters, such as the reactions time of the tong assembly to a specific type of tubulars and the speed of the tong assembly.

After a threaded connection is made up, the threaded connection is typically evaluated before carrying any loads. The initial evaluation may be used based on torque measurements and/or turn measurements made during makeup. However, the initial evaluation based on the measurements usually results in false failure diagnosis and a human operator has to perform further examination to reach a final decision.

Therefore, there is a need for improved methods for making up and evaluating tubular connections.

SUMMARY OF THE DISCLOSURE

Embodiments of the present disclosure relate to apparatus and methods for autonomous making up and evaluation of threaded connections.

One or more embodiments of the present disclosure relate to a method of making up a tubular joint. The method includes rotating a first tubular relative to a second tubular at a first speed to make a threaded connection between the first and second tubulars using a tong assembly while measuring one or more parameters, wherein the one or more parameters includes at least one of torque applied to the threaded connection, turns of the first tubular, or combination thereof, correcting measurements of the one or more parameters to remove effects due to mechanical properties and dynamic behavior of the tong assembly, evaluating corrected measurements of the one or more parameters, and accepting or rejecting the threaded connection based on the evaluation.

One or more embodiments relate to a tubular makeup system. The system includes a tong assembly comprising a power tong for clamping to a first tubular and rotate the first tubular, and a backup tong for clamping to a second tubular and hold the second tubular stationary, and a controller including instructions, which when executed, perform operations comprising making up a threaded connection using the tong assembly while measuring one or more parameters, wherein the one or more parameters include at least one of torque applied to the threaded connection, turns of the first tubular, or combination thereof, correcting measurements of the one or more parameters to remove effects due to mechanical properties and dynamic behavior of the tong assembly, and evaluating the threaded connection using corrected measurements of the one or more parameters.

One or more embodiments relate to a method of making up a tubular joint. The method includes rotating a first tubular relative to a second tubular at a first speed to make a threaded connection between the first and second tubulars using a tong assembly while measuring one or more parameters, wherein the one or more parameters includes at least one of torque applied to the threaded connection, turns of the first tubular, or combination thereof, recording one or more operating parameters of the tong assembly, evaluating the one or more operating parameters and measurements of the one or more parameters for a marker, and accepting or rejecting the threaded connection based on the evaluation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to apparatus and methods for making up and evaluating tubular threaded connections. A tong assembly may be used for making up threaded connections. A threaded connection may be made up automatically by controlling the rotation speed of the tong assembly according to measurements of torque, turns, and/or time. After a threaded connection is made up, measurements of time, torque, and/or turns may be corrected based on operating parameters, such as rotation speed. The corrected measurements may be evaluated for compliance with torque and/or turns requirements and indications of failure, such as discontinuity, torque spikes, torque drops, etc. The threaded connection is then accepted or rejected based on the evaluation.

Figure 1A:
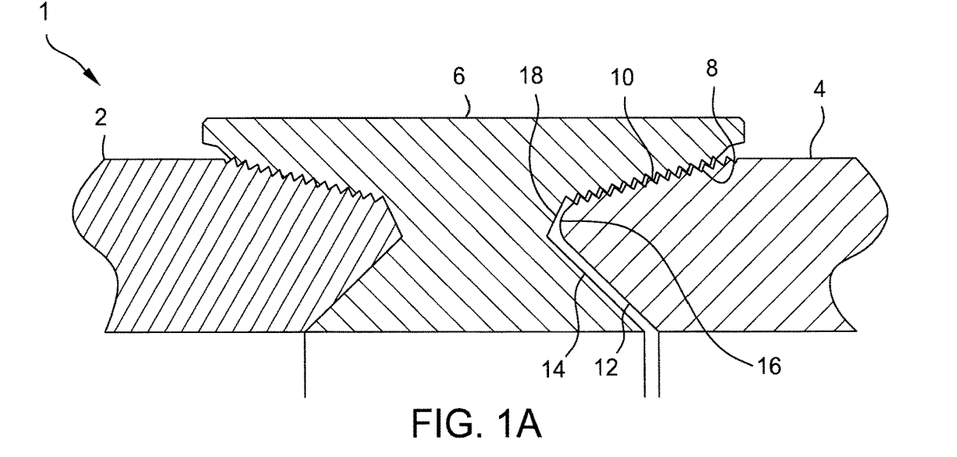
FIG. 1A is a partial cross section view of a connection between threaded premium grade tubulars.

FIG. 1A illustrates a connection 1 between premium grade tubulars 2, 4. The tubulars 2, 4 may be any oil industry tubular good, such as production tubing, casing, liner, or drill pipe. The connection 1 may include a first tubular 2 joined to a second tubular 4 through a tubular coupling 6. Each of the tubulars 2, 4 and the coupling 6 may be made from a metal or alloy, such as plain carbon steel, low alloy steel, high strength low alloy steel, stainless steel, or a nickel based alloy. The end of each tubular 2, 4 may have a tapered externally-threaded surface 8 (aka a pin) which co-operates with a correspondingly tapered internally-threaded surface (aka box) 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing areas 16,18 may be located at other positions in the connection 1 than adjacent the shoulders 12,14.

Figure 1B:
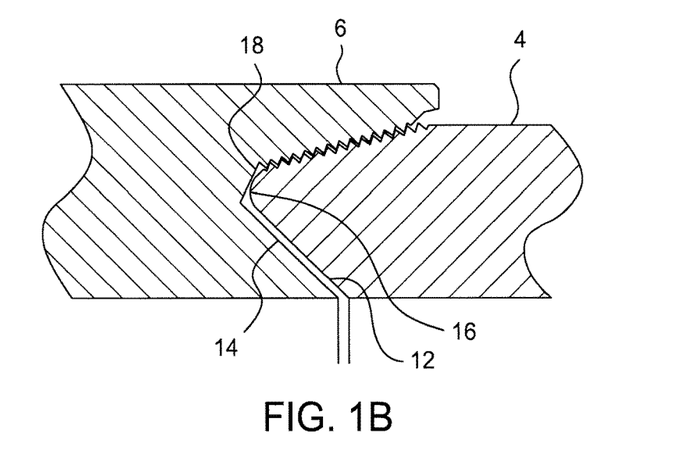
FIG. 1B is a partial cross section view of a connection between threaded premium grade tubulars in a seal position formed by engagement between sealing surfaces.
Figure 1C:
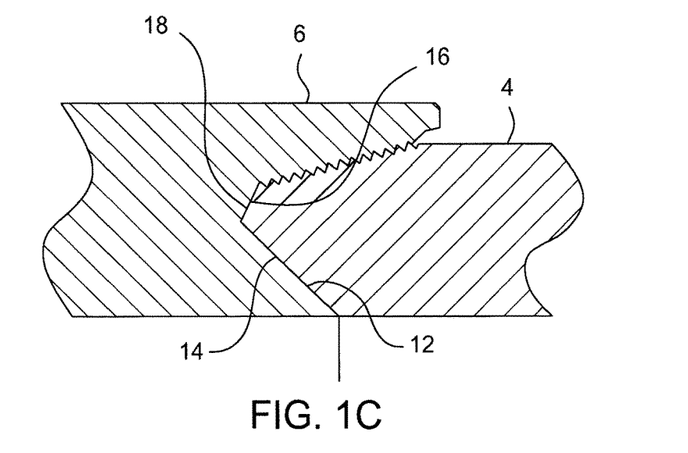
FIG. 1C is a partial cross section view of a connection between threaded premium grade tubulars in a shoulder position formed by engagement between shoulder surfaces.

During makeup, the box 10 is engaged with the pin 8 and then screwed onto the pin by relative rotation therewith. During continued rotation, the annular sealing areas 16, 18 contact one another, as shown in FIG. 1B. This initial contact is referred to as the "seal position". As the coupling 6 is further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
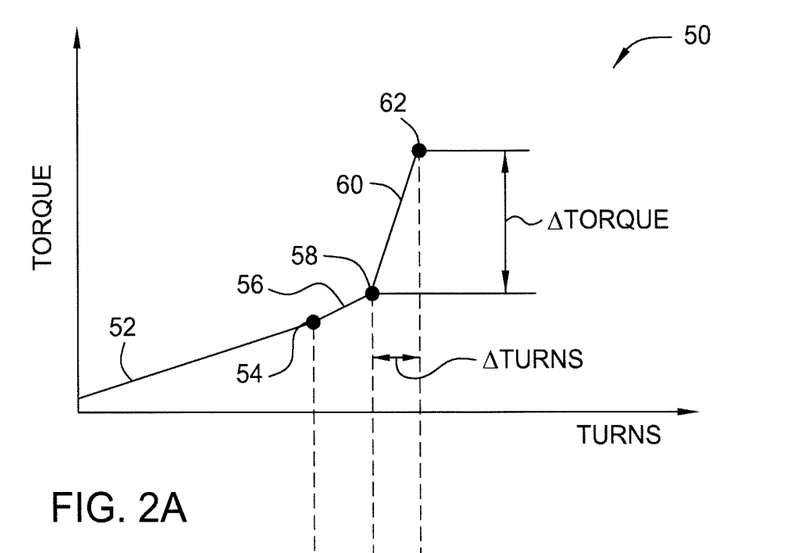
FIG. 2A illustrates an ideal torque-turns curve for the tubular connection.
Figure 2B:
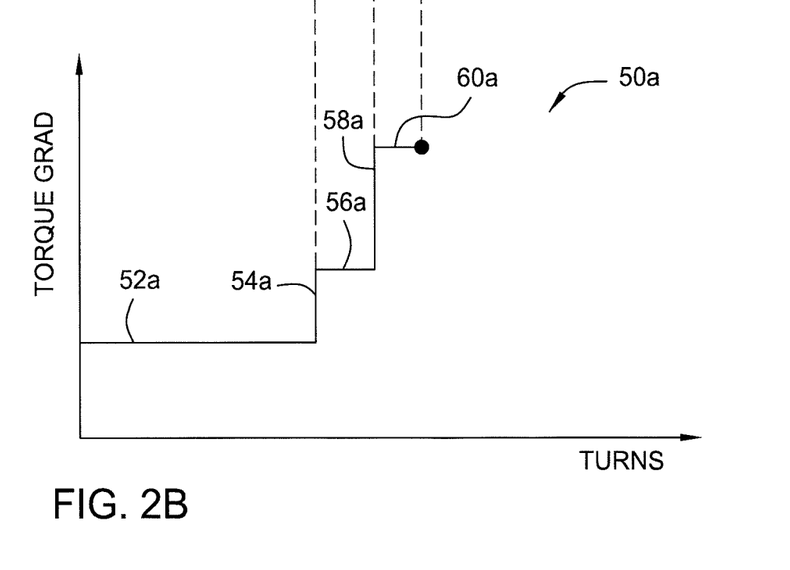
FIG. 2B illustrates an ideal torque gradient-turns curve for the tubular connection.

FIG. 2A illustrates an ideal torque-turns curve 50 for the tubular connection. FIG. 2B illustrates an ideal torque gradient-turns curve 50a for the tubular connection. During makeup of the tubulars 2, 4, torque and turns measurements may be recorded and the curves 50, 50a displayed for evaluation by a technician. Shortly after the coupling 6 engages the tubular 4 and torque is applied, the measured torque increases linearly as illustrated by curve portion 52. As a result, corresponding curve portion 52a of the differential curve 50a is flat at some positive value.

During continued rotation, the annular sealing areas 16, 18 contact one another causing a slight change (specifically, an increase) in the torque rate, as illustrated by point 54. Thus, point 54 corresponds to the seal position shown in FIGS. 1B and 1s plotted as the first step 54a of the differential curve 50a. The torque rate then again stabilizes resulting in the linear curve portion 56 and the plateau 56a. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58a. The torque rate then again increases linearly as illustrated by curve portion 60 and the plateau 60a until makeup of the connection is terminated at final torque 62.

Figure 3A:
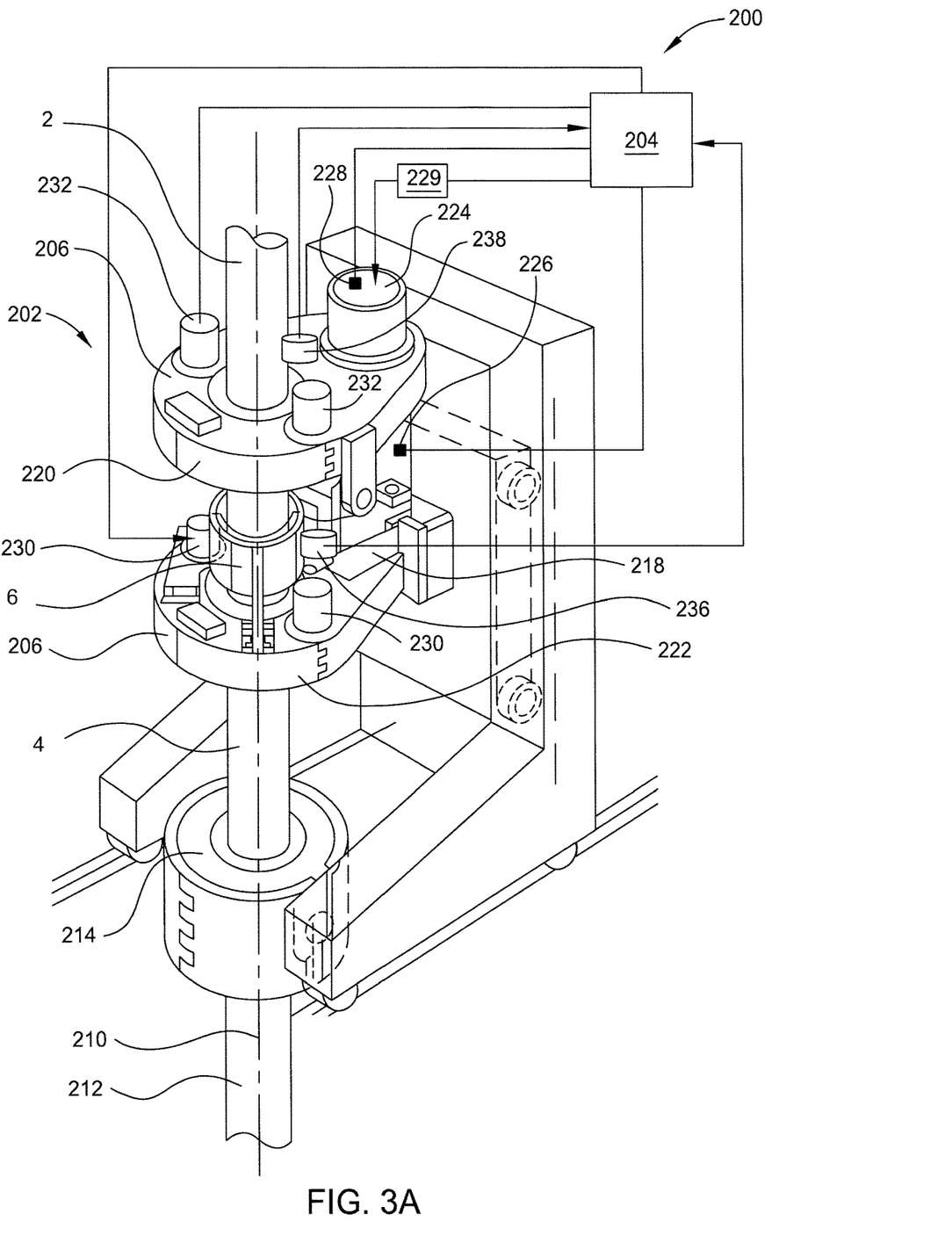
FIG. 3A is a schematic perspective view of a tubular makeup and evaluation according to one embodiment of the present disclosure.

FIG. 3A is a schematic perspective view of a tubular makeup and evaluation system 200 according to one embodiment of the present disclosure. The tubular makeup and evaluation system 200 may include a tong assembly 202 and a controller 204 for controlling the tong assembly 202 during a makeup process and for evaluating threaded connections.

The tong assembly 202 may include a power tong 206 and a backup tong 208. During operation, the tong assembly 202 may be placed on a drilling rig coaxially with a central axis 210 of a workstring 212. The tong assembly 202 may be disposed above a spider 214 on the drilling rig to add a tubular 2 to the workstring 212 or to remove the tubular 2 from the workstring 212 while the workstring 212 rests in the spider 214.

During operation, the power tong 206 receives and clamps to a first tubular, such as the tubular 2, while the backup tong 208 receives and clamps to a second tubular, such as a tubular 44 on top of the work string 212. In some embodiments, the tubular 44 may include a coupling 6 that is pre-made on the tubular 44. The backup tong 208 clamps to the tubular 4 below the coupling 66. The power tong 206 rotates the first tubular while the backup tong 208 holds the second tubular stationary causing relative rotation between the first tubular and second tubular, thus, making up a threaded connection between the first and second tubulars or breaking out the threaded connection between the first and second tubulars.

The power tong 206 and the backup tong 208 may be coupled together by a frame 218. In one embodiment, the power tong 206 may include a side door 220 which may open to receive or release a tubular and close to clamp the tubular in the power tong 206. Similarly, the backup tong 208 may include a side door 222 which may open to receive or release a tubular and close to clamp the tubular in the backup tong 208.

One or more actuators 232 may be used to drive gripping pads in the power tong 206 to clamp a tubular during operation. One or more actuators 230 may be used to drive gripping pads in the backup tong 208 to clamp a tubular and hold the tubular stationary during operation. The actuators 230, 232 may be hydraulic actuators, mechanical actuators, or other suitable actuators. The actuators 230, 232 are connected to the controller 204 and may receive commands from the controller 204 to clamp a tubular, release a tubular, or adjust clamping force exerted against a tubular. The controller 204 may be connected to other actuators, such as the actuators 230, 232, through a drive unit, such as a hydraulic power unit when the actuators are hydraulic actuators.

The power tong 206 may include a drive unit 229 configured to drive a motor assembly 224. The motor assembly 224 is configured to rotate the tubular clamped in the power tong 206. In one embodiment, the drive unit 229 may be a hydraulic drive circuit configured to drive a hydraulic motor. The motor assembly 224 may include a drive motor and a gear assembly. The motor assembly 224 may include a hydraulic motor assembly or an electric motor assembly. The motor assembly 224 and the drive unit 229 are connected to the controller 204. The motor assembly 224 may receive commands from the controller 204 to rotate forward, backward, and at a target speed.

In one embodiment, the tong assembly 202 may include a turns counter 228. The turns counter 228 may be connected to the controller 204 to monitor the rotation of the power tong 206. In one embodiment, the turns counter 228 may be an internal turns counter such as a decoder connected to a drive shaft inside a gear box of the power tong 206. The turns counter 228 is connected to the controller 204 and can be used to measure turns of the tubular clamped in the power tong 206 during operation.

In some embodiments, the tong assembly 202 includes a turns sensor 238 mounted on the power tong 206. The turns sensor 238 is configured to measure turns of the tubular clamped in the power tong 206. Measurements of the turns sensor 238 may be used to generate commands for rotational speed in a closed loop control during an automated makeup process according to the present disclosure. Measurements of the turns sensor 238 may also be used to evaluate the threaded connection during an automated evaluation process according to the present disclosure. The turns sensor 238 may be any sensor capable of measuring rotation. The turns sensor 238 may be contactless turns counter. For example, the turns sensor 238 may be an optical camera based sensor or a laser based sensor. Alternatively, the turns sensor 238 may be configured to contact a surface to be measured for rotation. For example, the turns sensor 238 may be a friction wheel sensor. The turns sensor 238 is connected to the controller 204 to send measurements to the controller 204.

In some embodiments, the tong assembly 202 includes a turns sensor 236 mounted on the backup tong 208 configured to measure rotation of the tubular clamped in the backup tong 208. The turns sensor 236 may be positioned to measure relative rotation of the tubular 4 or the coupling 6 relative to the backup tong 208. Measurements of the turns sensor 236 may be used to detect backup slippage and/or coupling rotation during an automated makeup process according to the present disclosure. Measurements of the turns sensor 236 may also be used to evaluate the threaded connection during an automated evaluation process according to the present disclosure. The turns sensor 236 may be any sensor capable of measuring rotation. The turns sensor 236 may be contactless turns counter. For example, the turns sensor 236 may be an optical camera based sensor or a laser based sensor. Alternatively, the turns sensor 236 may be configured to contact a surface to be measured for rotation. For example, the turns sensor 236 may be a friction wheel sensor.

In one embodiment, the tong assembly 202 may include one or more load cells 226 positioned to measure the torque applied to the tubulars of the threaded connection being made up or broken out by the tong assembly 202. In one embodiment, the load cell 226 may be disposed in a torque load path between the power tong 206 and the backup tong 208. Alternatively, the load cell 226 may be positioned to measure a displacement of the tong assembly 202. The measured displacement may be used to calculate the torque between the tubulars in the tong assembly 202. Measurements of the load cell 226 may be used to generate rotation command to the power tong 206 during an automated makeup process according to the present disclosure. Measurements of load cell 226 may also be used to evaluate the threaded connection during an automated evaluation process according to the present disclosure.

The controller 204 is connected to the tong assembly 202 and may include hardware and software for performing automated makeup operations and automated evaluation operations. The controller 204 may include various hardware, such as processors, programmable logic controllers (PLCs), one or more computers, and one or more mobile devices. Hardware of the controller 204 may be positioned together or at separate locations. For example, the controller 204 may include a PLC that is positioned in-situ with the tong assembly 202 for performing an automated makeup process, a computer that is positioned remotely for performing an automated evaluation process, and one or more mobile devices that are located at remote locations. Communications between the controller 204 and the tong assembly 202 may include wired and wireless communication.

Figure 3B:
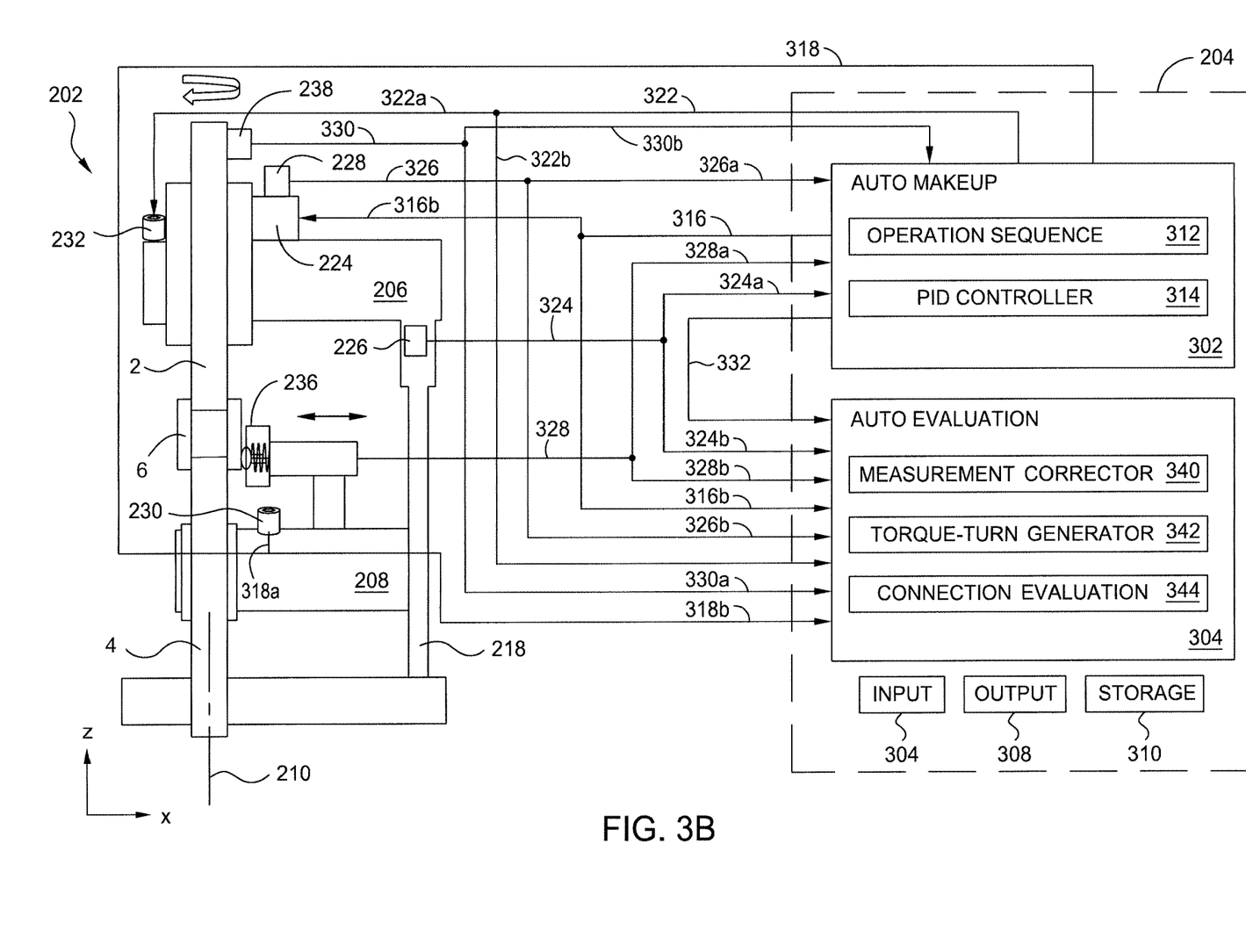
FIG. 3B is a block diagram illustrating a tubular makeup and evaluation system, according to one embodiment of the present disclosure.

FIG. 3B is a block diagram illustrating the tubular makeup system 200, according to one embodiment of the present disclosure. FIG. 3B schematically illustrates the controller 204 according to one embodiment of the present disclosure. FIG. 3B also demonstrates connections between the controller 204 and the tong assembly 202 to achieve a combined automated makeup process and automated evaluation process.

As discussed above, the controller 204 includes a combination of hardware components and software programs configured to perform an automated makeup process and automated evaluation process. Even though the controller 204 is shown as one block in FIG. 3B, hardware and software components in the controller 204 may be integrated together or distributed in multiple locations.

The controller 204 includes an automated makeup module 302 and an automated evaluation module 304. The controller 204 may also include one or more input devices 306, one or more output devices 308, and a storage device 310.

The input device 306 may include keyboards, mice, push buttons, microphones, joysticks, or other user interface components. The input device 306 is configured to receive tubular information, system configuration, commands from human operators, or other information related to the automated makeup process and the automated evaluation process according to the present disclosure. In some embodiments, predetermined values, such as an optimum torque value, a dump torque value, and a minimum and maximum torque value, may be input through the input device 306 prior to making a threaded connection.

The output devices 308 may include monitors, printers, speakers, or other user interface components. The output device 308 may be used to provide operating details to human operators. For example, during an automated makeup process, a technician may observe the operating details on an output device, such as a video monitor. A technician may observe the various predefined values which have been input for a particular connection. Further, the technician may observe graphical information such as the torque rate curve 50 and the torque rate differential curve 50a.

The storage device 310 may be a hard drive or solid state drive that is connected to hardware components of the controller 204. Alternatively, the storage device 310 may be located in the cloud for recording makeup data, tubular information, and other data related to an operation. The stored data may then be used to generate a post makeup report.

In some embodiments, information related to the automated makeup process may be used in the automated evaluation process to correct measurement data, remove false failure information, therefore, improve efficiency of the entire process. FIG. 3B schematically illustrates connections among the tong assembly 202, the automated makeup module 302 and the automated evaluation module 304.

The automated makeup module 302 sends out commands to the motor assembly 224 to control the rotation direction and speed of the power tong 206 via connection 316. A first branch 316a of the connection 316 goes to the motor assembly 224 to control the power tong 206 during operation. A second branch 316b of the connection 316 goes to the automated evaluation module 304, wherein data related to motor operation is recorded and used for evaluation of the connection being made.

The automated makeup module 302 sends out commands to the actuators 230, 232 to clamping and clamping forces in the backup tong 208 and the power tong 206 via connections 318, 322 respectively. A first branch 318a, 322a of the connection 318, 322 goes to the actuators 230, 232 to control clamping and release of tubulars in the tong assembly 202 during operation. A second branch 318b, 322b of the connection 318, 322 goes to the automated evaluation module 304, wherein data related to clamping operation is recorded and used for evaluation of the connection being made.

Similarly, other operations commands from the automated makeup module 302 may also be connected to both the actuators and the automated evaluation module 304 for use in evaluation. In some embodiments, operation parameters generated in the automated makeup module 302 but not sent out to any actuators, such as a determination of backup tong slippage, non-engagement between the tubulars, may be sent to the automated evaluation module 304 via connection 332.

In one embodiment, measurements of the load cell 226 may be sent to the automated makeup module 302 and the automated evaluation module 304 through connection 324-324a and 324-324b respectively. During operation, the measurements of the load cell 226 may be sent to the automated makeup module 302 and the automated evaluation module 304 in synchronization or at different frequency and/or for different time periods according to the process design. Measurements of the load cell 226 may be used to determine torque applied to the threaded connection and used for controlling the makeup process and as basis for evaluating the threaded connection.

In one embodiment, measurements of the turns counter 228 may be sent to the automated makeup module 302 and the automated evaluation module 304 through connection 326-326a and 326-326b respectively. During operation, the measurements of the turns counter 228 may be sent to the automated makeup module 302 and the automated evaluation module 304 in synchronization or at different frequency and/or for different time periods according to the process design. Measurements of the turns counter 228 may be used to determine turns made by the motor to the threaded connection and used for controlling the makeup process and as basis for evaluating the threaded connection.

In one embodiment, measurements of the turns sensor 238 may be sent to the automated makeup module 302 and the automated evaluation module 304 through connection 330-330a and 330-330b respectively. During operation, the measurements of the turns sensor 238 may be sent to the automated makeup module 302 and the automated evaluation module 304 in synchronization or at different frequency and/or for different time periods according to the process design. Measurements of the turns sensor 238 may be used to determine turns made to the tubular clamped by the power tong 206 and used for controlling the makeup process and as basis for evaluating the threaded connection.

In one embodiment, measurements of the turns sensor 236 may be sent to the automated makeup module 302 and the automated evaluation module 304 through connection 328-328a and 328-328b respectively. During operation, the measurements of the turns sensor 236 may be sent to the automated makeup module 302 and the automated evaluation module 304 in synchronization or at different frequency and/or for different time periods according to the process design. Measurements of the turns sensor 236 may be used to determine backup tong slippage or coupling rotation and used for controlling the makeup process and as basis for evaluating the threaded connection.

The connections 316, 318, 322, 324, 328, 330, and 332 may be wired connections, wireless connections, or virtual connections achieved by data sharing according to the function of the connection.

The automated makeup module 302 configured to enable automated makeup or breakout process according to one embodiment of the present disclosure. The automated makeup module 302 may include a programmable logic controller (PLC) that is connected to actuators and sensors in the tong assembly 202. The automated makeup module 302 may include a control program, which when operated, generates commands to control rotational speed of the power tong 206 according to the measured torque applied between the tubulars in the tong assembly 202 or other operating conditions.

In one embodiment, the makeup module 302 includes an operating sequence program 312 and a PID controller program 314. When operated, the operating sequence program 312 generates commands to the tong assembly 202 to perform an automated makeup process or automated breakout process. For example, the operating sequence program 312 sends commands to the tong assembly 202 to perform a plurality of steps for making up or breaking out a threaded connection. The PID controller program 314 is configured to control the tong assembly 202 at a certain stage of a makeup process to perform an automatic speed reduction operation to stop rotation when a threaded connection is made. The PID controller program 314 may be activated by the operating sequence program 312 when a trigger condition occurs. The trigger condition may include a measured torque between the tubulars reaches a predetermined value, rotation of the tubular has been performed for a predetermined time duration, or a predetermined turns is rotated between the first and second tubulars. Examples of the PID controller program 314 may be found in U.S. patent application Ser. No. 15/544,515 (entitled "apparatus and method for connecting tubulars") and Ser. No. 15/889,037 (entitled "apparatus and method for connecting tubulars"), which are incorporated herein by references.

During operation, the automated makeup module 302 monitors various sensors in the tong assembly 202, generates commands based on the sensor measurements, and sends out command signals to various components in the tong assembly 202 to complete the operation.

The automated evaluation module 304 is configured to automatically evaluate a threaded connection based on process parameters and sensor measurements made during makeup. After a threaded connection is made using the automated makeup module 302, the threaded connection can be evaluated by the automated evaluation module 304 for a decision whether the threaded connection is acceptable or should be rejected and remake.

In one embodiment, the automated evaluation module 304 may include a measurement corrector 340, a torque-turn generator 342, and a connection evaluator 344. The measurement correction block 340 is configured to correlate measurements with recorded operating data to reduce false failure diagnosis by the connection evaluator 344. The torque-turn generator 342 is configured to generate torque-turn curves and/or other correlations between the measured data. The torque-turn curves may be used by the connection evaluator 344 to detect markers that indicate an unacceptable threaded connection.

The connection evaluator 344 includes various algorithms used to process measured data and identify markers of an unacceptable threaded connection. For example, the connection evaluator 344 may include a discontinuity detector, a lack of connection detector, a spike detector, a data filter, a final torque value calculator, a dump detector, a torque drop detector, a shoulder detector, and an overlay processor. For example, the connection evaluator 344 evaluates the measured turns, measured torque, and/or measured time for a discontinuity, a torque spike, and/or a torque drop, and rejects the threaded connection if one or more discontinuity, torque spike, and/or torque drop is identified. Examples of the connection evaluator 344 may be found in U.S. patent application Ser. No. 15/545,361 (entitled "autonomous connection evaluation and automated shoulder detection for tubular make") and Ser. No. 15/792,592 (entitled "Method and system for evaluating tubular makeup"), which are incorporated herein by references.

According to embodiments of the present disclosure, one or a combination of measurements made during makeup, such as time, torque, and/or turns measurements, are corrected by the measurement corrector 340 before being used to evaluate the threaded connection by the connection evaluator 344. In some embodiments, the measurement corrector 340 correlates the torque measurements, turn measurements, and time measurements with operating information received from the automated makeup module 302.

In one embodiment, the measurement corrector 340 includes a coupling rotation correction. When making up a threaded connection between a first tubular, such as tubular 2, with a second tubular having a coupling, such as the tubular 4 and the coupling 6, rotation of the coupling 6 relative to the backup tong 208 affects the measurements of the turns counter attached to the first tubular, such as the turns counter 238 or the turns counter 228. When the coupling 6 turns, which may be caused by backup tong slippage or rotation between the coupling 6 and the tubular 4, turns of the tubular 2 measured by the turns counter 238 or turns counter 228 does not reflect the actual turns occurred in the threaded connection being evaluated, that is the threaded connection between the tubular 2 and the coupling 6.

In one embodiment of the present disclosure, the measurement corrector 340 includes correcting turns measurement of the tubular rotated by the power tong 206 with measurement of coupling turns. For example, when turns measurement from the turns counter 228 or 238 is used to evaluate the threaded connection, the turns measurement is first corrected using turns measurement by the turns counter 236 or 238, which measure turns of the coupling 6 or the second tubular 4. In some embodiments, measurements of turns counter 236 is subtracted from the turns measurements of the turns counter 228 or 238. The coupling rotation correction removes potential false characterization of yielding through the torque-turn graph.

In one embodiment, the measurement corrector 340 includes a structure dynamic correction. Dynamic behavior of the tong assembly 202 has a significant influence on torque-turn curves that are used in evaluating a threaded connection made by the tong assembly and is likely to create patterns in the torque-turn curve that appear unacceptable. For example inertia of the tong assembly during reducing speed on the power tong will create a changing torque signature the same as yielding. In some embodiments, the measurement corrector 340 correlates recorded operating parameters, such as decelerating commands received from the connection 316-316*b*, with the torque measurements to identify and remove torque spikes caused by tong dynamics during decelerating. Similarly, other actions, such as acceleration and dumping, may be correlated to remove false failure patterns in the torque-turn curve or other graphs used for evaluation.

In one embodiment, the measurement corrector 340 includes a displacement correction. Flexible deformation of the tong structure occurs during operations, such as when the tong assembly carries the load of torque and/or weight, when the tong clamps at the tubular, and when the clamping force is changed. For example, an increased clamping force will drive protrusions on the gripping pads deeper into the tubular being clamped resulting in additional turns of the tong assembly while the tubulars clamped in the tong assembly stay stationary. The flexible deformation sometime results in additional turns measured in the turns sensors coupled to the tong assembly, such as the turns counter 228. The additional turns captured by the internal turns counters, such as the turns counter 228, do not reflect the actual turns of the tubulars. In one embodiment, turns measurement, such as measurements from the turns counter 228, is corrected according to commands of clamping, such as commands received from the automated makeup module 302 via connections 318-318*b* and 322-322*b*.

Correlating the operating information from the automated makeup module 302 with the automated evaluation module 304 makes it possible to correlate false failure patterns in the torque-turn graphs according to the mechanisms that caused the false failure patterns. The measurement corrector 340 may identify and remove false failure patterns that result from incorrect turns data like that described in the coupling rotation correction and the displacement correction. The measurement corrector 340 may also identify and remove false failure patterns that result from erroneous torque-turn data or noise like that described in the structure dynamic correction. In general, the measurement corrector 340 may account for false failure patterns caused by various tong operating parameters so that evaluation of the threaded connection is predominantly based on actual change in torque and turns of the threaded connection, thus increasing accuracy.

By correlating operating parameters with measurements, the automated evaluation module 304 according to the present disclosure increases accuracy of the automated evaluation. Automated evaluation based on measurements only has a higher reject rate than evaluation by human operators. Connections that are acceptable by a human operator are sometime rejected because false failure patterns that result from dynamic behaviors and mechanical properties of the tong assembly as well as incorrect turns data. Automated evaluation according to the present disclosure improves traceability of decisions by a human and allows for more detailed evaluation without sacrificing measurement resolution by applying filters. Instead of reducing sensitivity of the evaluation using filters, the automated evaluation methods according to the present disclosure removes known issues from the evaluation, therefore allowing a higher resolution on the data.

Figure 4:
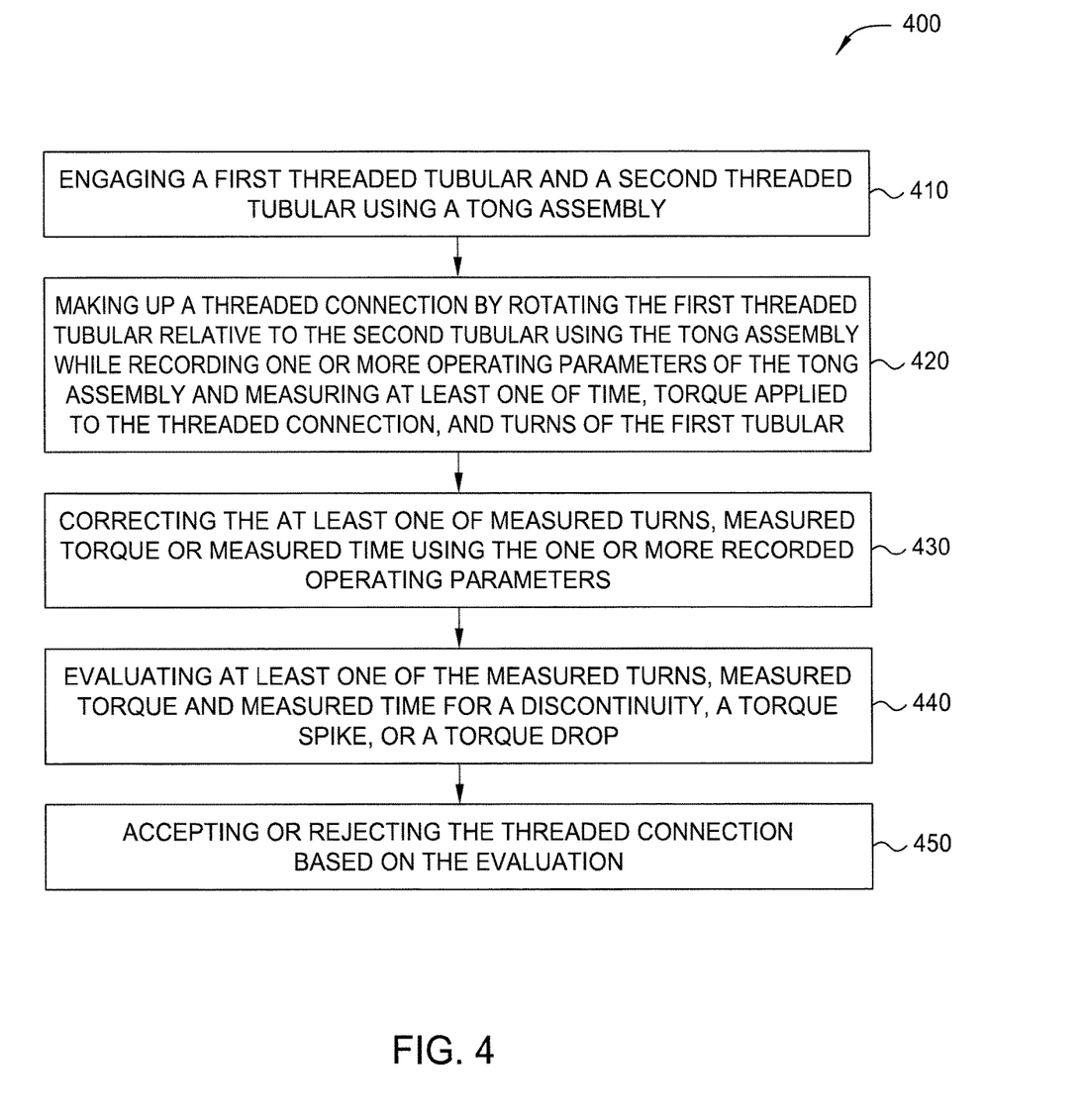
FIG. 4 is a flow chart of a method for making up and evaluating a tubular connection evaluator according to one embodiment of the present disclosure.

FIG. 4 is a flow chart of a method 400 for making up and evaluating a tubular connection evaluator according to one embodiment of the present disclosure. The method 400 may be performed by the tubular makeup and evaluation system 200 described above.

In operation 410, a first threaded tubular, such as the tubular 2, and a second threaded tubular, such as the tubular 4 and coupling 6, are engaged using a tong assembly, such as the tong assembly 202. The engagement of the threaded tubulars may be in the condition as shown in FIG. 1A.

In operation 420, a threaded connection is made automatically by rotating the first threaded tubular relative to the second tubular using the tong assembly. The threaded connection may be made by operating the automated makeup module 302 described above to control the tong assembly 202. In some embodiment, operating information, such as instructions to the tong assembly, is recorded during operation. The operating information may include clamping commands, change to rotational speed, and rotation speed and direction. In one embodiment, at least one time, torque applied to the threaded connection, and turns of the first tubular is measured in operation 420. The measurements are used to achieve automatic control during makeup and to evaluate quality of the threaded connection being made.

In one embodiment, relative rotation of the tubulars is stopped when a threaded connection has reached a target torque, a target time or a target turns. In one embodiment, making the threaded connection includes starting an automatic speed reduction operation to reduce rotating speed to zero upon detection of a trigger condition. The trigger condition may be one of: a measured torque between the first and second tubulars reaches a predetermined value, rotation of the first tubular has been performed for a pre-determined time duration, and a predetermined turns is rotated between the first and second tubulars.

In operation 430, measurements used for evaluating the threaded connection are corrected by correlating with recorded operation information. Operation 430 may be performed by operating the measurement corrector 342 in the automated evaluation module 304. In one embodiment, the measurement correction includes correcting measured turns according to coupling rotation. In another embodiment, the measurement correction includes correction measured torque according the tong dynamic behaviors, such as deceleration of the tong assembly. In another embodiment, measurement correction includes correcting measured turns according to flexible deformation occurred during clamping and loading.

In operation 440, the threaded connection is evaluated using the corrected measurements. Operation 440 may be performed by operating the connection evaluator 344 in the automated evaluation module 304. Evaluation may include evaluating at least one of corrected measured turns, corrected measured torque, and measured time for a discontinuity, a torque spike or a torque drop.

In operation 450, the threaded connection is either rejected or accepted according the evaluation in operation 440.

One or more embodiments of the present disclosure relate to a method of making up a tubular joint. The method includes rotating a first tubular relative to a second tubular at a first speed to make a threaded connection between the first and second tubulars using a tong assembly while measuring one or more parameters, wherein the one or more parameters includes at least one of torque applied to the threaded connection, turns of the first tubular, or combination thereof, correcting measurements of the one or more parameters to remove effects due to mechanical properties and dynamic behavior of the tong assembly, evaluating corrected measurements of the one or more parameters, and accepting or rejecting the threaded connection based on the evaluation.

In some embodiments, evaluating corrected measurements of the one or more parameters comprises evaluating corrected measurements of turns or corrected measurements of torque for a discontinuity, a spike, and a drop.

In some embodiments, during rotating, the first tubular is clamped by a power tong in the tong assembly and the second tubular is clamped by a backup tong of the power tong.

In some embodiments, the method further includes measuring the turns of the second tubular using a turns sensor attached to the backup tong, and wherein correcting measurements of the one or more parameters comprises: correcting measurements of turns of the first tubular according to turns of the second tubular.

In some embodiments, correcting measurements of the one or more parameters comprises: correcting measurements of torque according to a rotational speed change of the tong assembly.

In some embodiments, the method further includes correcting measurement of torque made during deceleration of the tong assembly.

In some embodiments, correcting measurements of the one or more parameters comprises: correcting measurements of turns of the first tubular according to clamping commands or change of clamping force.

In some embodiments, the method further includes reducing measurements of turns when clamping force is increased.

One or more embodiments relate to a tubular makeup system. The system includes a tong assembly comprising a power tong for clamping to a first tubular and rotate the first tubular, and a backup tong for clamping to a second tubular and hold the second tubular stationary, and a controller including instructions, which when executed, perform operations comprising making up a threaded connection using the tong assembly while measuring one or more parameters, wherein the one or more parameters include at least one of torque applied to the threaded connection, turns of the first tubular, or combination thereof, correcting measurements of the one or more parameters to remove effects due to mechanical properties and dynamic behavior of the tong assembly, and evaluating the threaded connection using corrected measurements of the one or more parameters.

In some embodiments, the instructions further comprise recording one or more operating parameters while making up the threaded connection, and correcting measurements of the one or more parameters to remove effects according to the one or more recorded operating parameters.

In some embodiments, the system further includes a turns counter positioned to measure turns of the second tubular relative to the backup tong, wherein the instructions further comprise correcting measurements of turns of the first tubular according to measured turns of the second tubular.

In some embodiments, correcting measurements of the one or more parameters to remove effects comprises correcting measurements of torque made during deceleration of the tong assembly.

In some embodiments, the controller comprises a programmable logic controller including programs for automatically making the threaded connection, and a computer having programs for correcting measurements of torque and evaluating the threaded connection.

One or more embodiments relate to a method of making up a tubular joint. The method includes rotating a first tubular relative to a second tubular at a first speed to make a threaded connection between the first and second tubulars using a tong assembly while measuring one or more parameters, wherein the one or more parameters includes at least one of torque applied to the threaded connection, turns of the first tubular, or combination thereof, recording one or more operating parameters of the tong assembly, evaluating the one or more operating parameters and measurements of the one or more parameters for a marker, and accepting or rejecting the threaded connection based on the evaluation.

In some embodiments, recording one or more operating parameters comprises recording commands sent to the tong assembly.

In some embodiments, evaluating the one or more operating parameters comprises: evaluating the one or more operating parameters for a deceleration command to the tong assembly and correcting measurements of torque made during deceleration.

In some embodiments, the method further includes measuring turns of the second tubular, and correcting measured turns of the first tubular according to measured turns of the second tubular.

In some embodiments, rotating the first tubular relative to the second tubular comprises starting an automatic speed reduction operation to reduce rotating speed to zero upon detection of a trigger condition based on measurements of the one or more parameters.

In some embodiments, the marker includes at least one of a discontinuity, a torque spike, and a torque drop in a torque-turn curve.

In some embodiments, evaluating the one or more operating parameters comprises evaluating the one or more operating parameters for dynamic behavior and mechanical properties of the tong assembly, and removing effects caused by dynamic behavior and mechanical properties of the tong assembly from the torque-turn curve.

While the foregoing is directed to embodiments of the present disclosure, other and further embodiments of the disclosure may be devised without departing from the basic scope thereof, and the scope of the invention is determined by the claims that follow.

The invention claimed is:

1. A method of making up a tubular joint, comprising:
rotating a first tubular relative to a second tubular at a first speed to make a threaded connection between the first and second tubulars using a tong assembly while measuring torque applied to the threaded connection;
correcting measurements of torque according to a rotational speed change of the tong assembly;
evaluating corrected measurements of torque; and
accepting or rejecting the threaded connection based on the evaluation.

2. The method of claim 1, further comprising:
measuring turns of the first tubular;
correcting measurements of turns of the first tubular; and
evaluating corrected measurements of turns or corrected measurements of torque for at least one of a discontinuity, a spike, a drop, and combination(s) thereof.

3. The method of claim 1, further comprising measuring turns of the first tubular, and wherein, during rotating, the first tubular is clamped by a power tong in the tong assembly and the second tubular is clamped by a backup tong of the tong assembly.

4. The method of claim 3, further comprising measuring the turns of the second tubular using a turns sensor attached to the backup tong, and correcting measurements of turns of the first tubular according to turns of the second tubular.

5. The method of claim 1, further comprising correcting measurements of torque made during deceleration of the tong assembly.

6. The method of claim 1, further comprising:
measuring turns of the first tubular; and
correcting measurements of turns of the first tubular according to clamping commands or a change of clamping force.

7. The method of claim 6, further comprising reducing measurements of turns of the first tubular when clamping force is increased.

8. A tubular makeup system, comprising:
a tong assembly comprising:
a power tong for clamping to a first tubular and rotate the first tubular; and
a backup tong for clamping to a second tubular and hold the second tubular stationary; and
a controller including instructions, which when executed, perform operations comprising:
making up a threaded connection using the tong assembly while measuring torque applied to the threaded connection;
correcting measurements of torque made during deceleration of the tong assembly; and
evaluating the threaded connection using corrected measurements of torque.

9. The tubular makeup system of claim 8, wherein the instructions further comprise:
recording one or more operating parameters while making up the threaded connection; and
correcting measurements of torque to remove effects according to the one or more recorded operating parameters.

10. The tubular makeup system of claim 8, further comprising:
a turns counter positioned to measure turns of the second tubular relative to the backup tong, wherein the instructions further comprise correcting measurements of turns of the first tubular according to measured turns of the second tubular.

11. The tubular makeup assembly of claim 8, wherein the controller comprises:
a programmable logic controller including programs for automatically making the threaded connection; and
a computer having programs for correcting measurements of torque and evaluating the threaded connection.

12. A method of making up a tubular joint, comprising:
rotating a first tubular relative to a second tubular at a first speed to make a threaded connection between the first and second tubulars using a tong assembly while measuring one or more parameters, wherein the one or more parameters includes at least one of torque applied to the threaded connection, turns of the first tubular, or combination thereof;
recording one or more operating parameters of the tong assembly;
evaluating the one or more operating parameters and measurements of the one or more parameters for a marker, wherein evaluating the one or more operating parameters comprises evaluating the one or more operating parameters for a deceleration command to the tong assembly and correcting measurements of torque made during deceleration; and
accepting or rejecting the threaded connection based on the evaluation.

13. The method of claim 12, wherein recording one or more operating parameters comprises recording commands sent to the tong assembly.

14. The method of claim 12, further comprising measuring turns of the second tubular, and correcting measured turns of the first tubular according to measured turns of the second tubular.

15. The method of claim 12, wherein rotating the first tubular relative to the second tubular comprises:
   starting an automatic speed reduction operation to reduce rotating speed to zero upon detection of a trigger condition based on measurements of the one or more parameters.

16. The method of claim 12, wherein the marker includes at least one of a discontinuity, a torque spike, a torque drop in a torque-turn curve, and combination(s) thereof.

17. The method of claim 16, wherein evaluating the one or more operating parameters comprises:
   evaluating the one or more operating parameters for dynamic behavior and mechanical properties of the tong assembly; and
   removing effects caused by dynamic behavior and mechanical properties of the tong assembly from the torque-turn curve.

\* \* \* \* \*